Patented Aug. 2, 1938

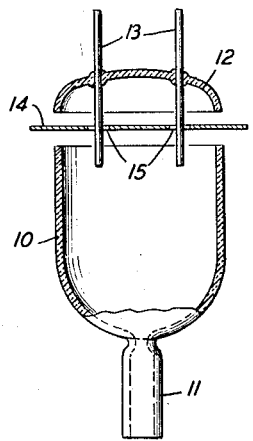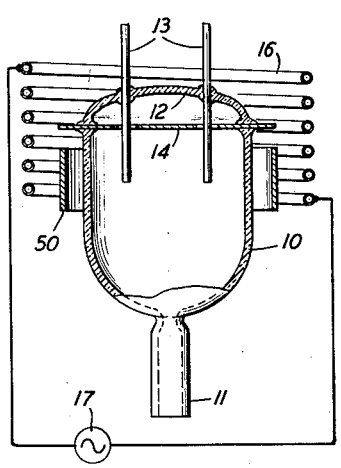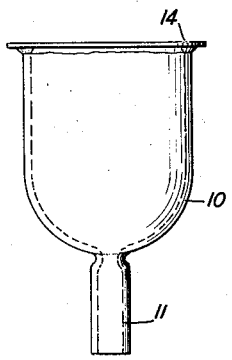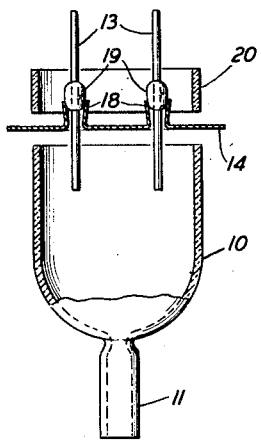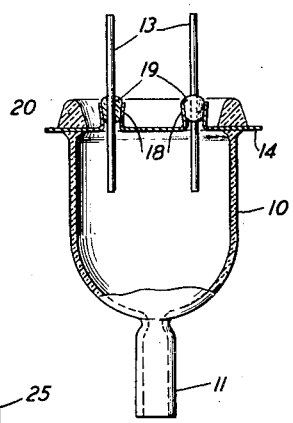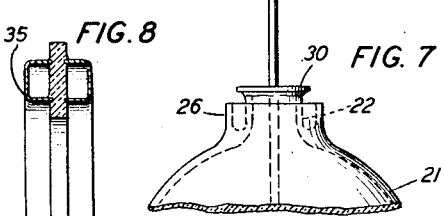

2,125,316

UNITED STATES PATENT OFFICE 2,125,316

METHOD OF FORMING GLASS TO METAL SEALS

Victor L. Ronci, Brooklyn, N. Y., assignor to Bell Telephone Laboratories, Incorporated, New York, N. Y., a corporation of New York Application February 4, 1936, Serial No. 62,253

2 Claims. (Cl. 250—27.5)

This invention relates to methods of forming glass to metal seals and more particularly to the fabrication of such seals in vessels to be evacuated, such as enclosing vessels of electron discharge devices.

One object of the invention is to attain a relatively sharp temperature gradient in a vitreous member for producing a hermetically sealed joint to a metallic member.

Another object of this invention is to obviate the use of a combustible heating medium in the fabrication of glass to metal seals.

A further object of this invention is to prevent oxidation of the electrodes of an electron discharge device during the sealing of the enclosing vessel.

In accordance with a feature of this invention, a glass to metal seal is produced by heating the metallic member, which is in contact with the glass member, by high frequency induction so that the thermal energy dissipated by the metallic element through conduction fuses the glass in the immediate vicinity of the metallic member to form a hermetic junction between the glass and the metal members.

In one illustrative application of this invention a disc of a suitable metal is placed in abutting relation with the open end of a glass vessel, or with the ends of two opposed portions of hollow glassware. The vessel or glassware may be, for example, portions of an enclosing vessel for an electron discharge device. A high frequency coil is positioned about the periphery of the disc and is energized, whereby the disc becomes heated to an intense degree and the thermal energy thus produced is transmitted to the portions of the glass immediately adjacent and in contact with the disc, and the glass is fused to the disc to form a hermetic seal therewith. The conduction heating method of this invention produces a sharp temperature gradient in the glass member so that only the immediate contact area of the glass is brought to a suitable "wetting" condition to form the seal.

In accordance with another feature of this invention, a hermetic glass to metal seal is produced under vacuum where it would be impossible to accomplish the sealing by the use of combustible media. This feature may be realized, for example, in the evacuation and sealing of enclosing vessels for electron discharge devices. To illustrate, a short inner sealing tube is provided in the exhaust tubulation on the enclosing vessel of the device and a metallic disc is suspended adjacent the outer end of the sealing tube during the exhaust of the vessel. When the vessel has been evacuated to the desired degree, the disc is lowered to seat upon the inner sealing tube and is then heated by a high frequency coil positioned about the exhaust tubulation, whereby the tube is fused to the disc and the enclosing vessel is thus sealed hermetically. The exhaust tubulation may then be severed from the vessel.

The invention and the various features thereof will be understood more clearly and fully from the following detailed description with reference to the accompanying drawing in which:

Fig. 1 is an exploded view in elevation and partly in cross-section of a three part enclosing vessel for an electron discharge device prior to the sealing thereof in accordance with this invention;

Fig. 2 illustrates the manner of sealing the vessel shown in Fig. 1, in accordance with this invention, the energizing source being shown schematically;

Fig. 3 is an elevational view partly in cross-section of a modified arrangement of the invention as applied to an enclosing vessel for an electron discharge device wherein the electrode supports or leading-in conductors are sealed to the metallic member at the same time as the vessel;

Fig. 4 shows the elements of Fig. 3 after the sealing of the vessel is performed in accordance with this invention;

Fig. 5 is another elevational view partly in cross-section illustrating a modified form of seal of the enclosing vessel shown in Fig. 2;

Fig. 6 is a view partly in cross-section illustrating the fabrication of a glass to metal seal under vacuum in accordance with this invention;

Fig. 7 is a detail view of the enclosing vessel illustrated in Fig. 6, showing the completed seal; and Fig. 8 is a view in cross-section illustrating the application of this invention to the fabrication of hermetic seals in a rotary mercury switch.

Referring now to the drawing, the vessel shown in Figs. 1 and 2, which may be an enclosing vessel for an electron discharge device, comprises an elongated cup-shaped receptacle or portion 10 of vitreous material, having an exhaust tubulation 11 sealed thereto, and a shallow base or end portion 12, which also is of vitreous material. The base or end portion 11 has sealed therein metallic rods or wires 13 which may be utilized as supports or leading-in conductors for the electrodes, not shown, of the device. A disc 14 of a suitable metal, for example, copper, is interposed between the juxtaposed edges of the vitreous portions 10 and 12 of the vessel and in contact therewith, the disc having apertures 15 through which the rods or wires 13 extend.

In the sealing of the enclosing vessel in accordance with this invention, as shown in Fig. 2 the rods 13 are sealed into the base or end portion 12, the disc 14 is slid over the rods 13 and an electrode or electrodes (not shown) are suitably affixed to the rods 13. The electrode unit as mounted on the base is inserted into the vessel 10 and the disc 14 seated upon the edge of the vessel 10, the base or end portion 12 being seated upon the disc 14 with its edge in alignment with the edge of the vessel 10. Subsequently, the disc 14 is encompassed by a high frequency coil 16 which is energized from a suitable high frequency source 17. The coil 16 is energized so that high frequency currents are induced in the disc 14 and the disc becomes heated to an intense degree. The thermal energy thus produced is transmitted to the vitreous portions 10 and 12 and consequently these portions are fused to the disc 14 and form a hermetic seal therewith.

During the sealing of the disc 14 to the vitreous members 10 and 12, a metallic shield 50 may be positioned about the member 10 to prevent heating of the electrodes within the vessel by the high frequency fields.

Inasmuch as but limited portions of the vitreous members 10 and 12 are in contact with the disc 14, a sharp temperature gradient obtains so that only those portions of the members 10 and 12 in the immediate vicinity of the ends thereof become sufficiently heated to soften appreciably and to fuse to the disc 14. Furthermore, the metallic rods or wires 13 do not become heated to any great extent so that objectionable oxidation thereof, which would obtain if the seal of the members 10 and 12 to the disc 14 were made by the use of combustible media, does not occur.

After the seal has been made as described above, the vessel may be thoroughly exhausted through the tubulation 11 and then sealed by fusing of the tubulation.

As illustrated in Figs. 3 and 4, the disc 14 may be provided with integral sockets 18 for receiving vitreous beads 19 fused to the rods or wires 13. In the fabrication of a device as shown in these figures, the beads 19 are fused to the rods or wires 13 prior to inserting the wires into the sockets 18 with the beads positioned partly in the sockets. The disc 14 is then seated upon the open end of the vitreous member 10 and an auxiliary or backing ring member 20 of vitreous material is seated upon the disc 14 with its lower edge in juxtaposition to the edge of the member 10. The disc 14 is heated subsequently by a high frequency coil, as described heretofore in connection with Fig. 2, so that the members 10 and 20 are fused to the disc. Some of the thermal energy produced in the disc 14 is transmitted to the beads 19 and the latter thereupon fuse to the sockets 18 and form a hermetic seal therewith.

It will be apparent that this invention enables the substantially simultaneous sealing of both the member 10 and the wires or rods 13 to the disc 14 in a single operation and thereby simplifies and expedites the fabrication of devices, such as electron discharge devices, and reduces the manufacturing cost thereof.

A vacuum tight vessel may be fabricated without the use of a backing member, such as the member 20, as shown in Fig. 5. In this figure, the disc 14 preferably is of an alloy, such as "Fernico", an alloy of iron, nickel and cobalt, having substantially the same coefficient of expansion as the glass which is fused thereto, and is secured to the end of the glass member 10 by heating it by high frequency induction as described hereinabove. It will be understood, of course, that in the structure shown in Fig. 5, metallic supports or leading-in conductors such as the wires or rods 13 may be sealed to the disc 14 in the same manner as illustrated in Figs. 3 and 4.

The invention may be utilized also to form seals under vacuum where it would be impossible to do so by the use of combustible media. One such application will be clear from Fig. 6 wherein there is shown an electron discharge device comprising a vitreous enclosing vessel 21 having an integral tubulation or sealing tube 22 at one end, and an anode 23. The anode has a threaded socket portion 24 into which a metallic rod or wire 25 is screwed, the rod or wire 25 being adapted to serve as a support and/or a leading-in conductor for the anode 23. The rod 25 is positioned centrally within an exhaust tube 26 which is sealed at one end to the vessel 21 about the tubulation 22 and at the other end to an exhaust header 27 connected to a suitable evacuating station, not shown. The rod 25 may be supported from a rigid wire or stub 28, sealed in the tube 26, by a helical spring 29, and has mounted thereon a disc 30, of a suitable metal, such as "Fernico", and a core member 31 of magnetic material. The magnetic member 31 is encompassed by an electromagnet or excitation coil 32.

In the fabrication of the electron discharge device, the electrodes are outgassed and the vessel 21 is evacuated through the tubulation 22 and tube 26, the disc 30 being held above the tubulation 22 during the exhaust operation by the action of the spring 29 upon the magnetic member 30. When the electrodes of the device have been outgassed and the vessel 21 has been evacuated to the desired degree, the coil 32 is energized and lowered to cause the core member 31 to descend so that the disc 30 is seated upon the tubulation 22. The disc 30 is then heated, by high frequency induction, by the coil 16, so that the tubulation 22 fuses to the disc and a hermetic seal between the disc 30 and vessel 21 is produced. Subsequently, the exhaust tube 26 may be severed in proximity to the vessel 21 as shown in Fig. 7.

It will be clear that in accordance with this invention as described heretofore in connection with Fig. 6, the use of an exhaust tubulation on the vessel 21, separate from the electrode seals is obviated and the fabrication of electron discharge devices is thereby simplified and expedited.

The invention may be used to advantage also in the fabrication of a mercury rotary switch or interrupter such as shown, for example, in Fig. 8. In this figure, an annulus of vitreous material 33 is provided with one or more apertures 34. The annulus 33 has secured to opposite sides thereof, annular metallic trough-shaped members 35 in one of which a quantity of mercury 36 may be introduced. The members 35 may be utilized as terminals in an electrical system and are electrically connected when the interrupter is in such position that the mercury may flow through the aperture 34 and form a metallic tie between the two members 35.

In the fabrication of the interrupter, the metallic members 35 are suitably held in engagement with the vitreous annulus 33 and are then heated by high frequency induction. The thermal energy thus produced in the metallic members 35 is transmitted to the annulus 33 and the latter is fused thereby to the metallic members 35. The mercury 36 may then be introduced into one of the metallic members 35 through an aperture, not shown, in this member. The aperture may be sealed subsequently in any suitable manner, as by welding.

Before the sealing of the members 35 to the annulus 33, these elements may be heated to some degree, for example, in an oven or by flames, to reduce the heating by the high frequency induction necessary to fuse the glass member to the metal member and to provide a desired temperature gradient in the vitreous member.

Although various specific applications of this invention have been shown and described, it will be understood that such applications are merely illustrative and that the invention may be utilized in a variety of other applications without departing from the scope and spirit thereof as defined in the appended claims.

What is claimed is:

1. The method of sealing a vitreous vessel which comprises providing said vessel with inner and outer tubulations, positioning a metallic disc within said outer tubulation and in alignment with the end of said inner tubulation, connecting said outer tubulation to an evacuation station, evacuating said vessel, moving said disc into engagement with the end of said inner tubulation, and inducing heat in said disc by high frequency induction to fuse said inner tubulation to said disc.

2. The method of fabricating an electron discharge device having an enclosing vessel provided with a tubulation at one end, which comprises sealing an exhaust tube to said vessel about said tubulation, positioning a metallic disc carrying an electrode support within said exhaust tube and opposite to the end of said tubulation, mounting an electrode upon said support and within said vessel, coupling said exhaust tube to an evacuation station, outgassing said electrode, evacuating said vessel, moving said disc into engagement with the end of said inner tubulation, positioning a high frequency coil around said exhaust tube and in cooperative relation to said disc, and energizing said coil whereby said disc is heated to a sufficiently high temperature to fuse said tubulation to said disc.

VICTOR L. RONCI.